United States Patent [19]

Brooks

[11] Patent Number: 5,342,707
[45] Date of Patent: Aug. 30, 1994

[54] BATTERY PINNED ENCLOSURE SNAP WALL

[75] Inventor: Dwight D. Brooks, Boynton Beach, Fla.

[73] Assignee: Motorola, Inc., Schaumburg, Ill.

[21] Appl. No.: 921,672

[22] Filed: Jul. 30, 1992

[51] Int. Cl.⁵ .................. H01M 2/10; H01M 2/04; H04B 1/16; H04B 1/08

[52] U.S. Cl. ............................ 429/97; 429/96; 429/98; 429/99; 429/100; 220/324; 340/825.44; 455/347; 455/348; 455/349; 455/351

[58] Field of Search .............. 429/96, 97, 98, 99, 429/100; 174/50, 52.1; 455/347, 351, 348, 349; 340/825.44; 220/324

[56] References Cited

U.S. PATENT DOCUMENTS

| | | | |
|---|---|---|---|
| 4,797,507 | 1/1989 | Löfving | 174/48 |
| 5,013,870 | 5/1991 | Navazo | 174/50 |
| 5,055,830 | 10/1991 | Cousins et al. | 340/693 |
| 5,206,098 | 4/1993 | Cho et al. | 429/96 |
| 5,251,104 | 10/1993 | Wandt et al. | 361/736 |

*Primary Examiner*—Emily Bernhardt
*Assistant Examiner*—Matthew V. Grumbling
*Attorney, Agent, or Firm*—R. Louis Breeden; Thomas G. Berry

[57] ABSTRACT

A latching device (110) for use in a latch system for a housing comprising first and second housing sections (102, 104), comprises a battery compartment (107) and a latch member (112) adjacent to the battery compartment. The latch member (112) is for coupling to the second housing section (104) to latch the first and second housing sections (102, 104) when the latch member (112) is in a first position and to unlatch the first and second housing sections (102, 104) when the latch member (112) is in a second position. The latching device (110) further comprises a movable extender member (114) coupled between the first housing section (102) and the latch member (112) for extending the latch member (112) into the second housing section (104) and for allowing the latch member (112) to move between the first and second positions, the latch member (112) being prevented from moving into the second position when a battery (106) is in the battery compartment (107).

11 Claims, 1 Drawing Sheet

5,342,707

BATTERY PINNED ENCLOSURE SNAP WALL

FIELD OF THE INVENTION

This invention relates in general to enclosure latch systems for devices, and more specifically to latch systems using a movable snap wall having apertures for mating with corresponding hooks.

BACKGROUND OF THE INVENTION

There are many types of latch systems for enclosures of devices, such as electronic devices. One well-known type of latch system is based upon an arrangement of cantilevered snaps and mating recesses. Such latch systems are advantageous in that they eliminate screws and screw bosses, thereby reducing assembly labor and increasing circuit board area usable for the electronic device. A further advantage is that such latch systems discourage unauthorized tampering with the electronic device by users who cannot readily discern a method of opening the enclosure.

A disadvantage of conventional latch systems using cantilevered snaps and mating recesses is that under some conditions, e.g., when the device is dropped accidentally, such conventional latch systems can become unlatched, possibly causing damage to the device. A conventional method of preventing accidental unlatching is to provide a single-purpose, removable, secondary locking mechanism that gives the enclosure more resistance to accidental unlatching forces. Still, a single-purpose, removable, secondary locking mechanism increases parts count and thus cost of the enclosure. Also, such removable locking mechanisms comprise a risk of being lost while removed.

Thus, what is needed is a secondary locking mechanism that provides all the advantages offered by conventional secondary locking mechanisms but that eliminates the aforementioned disadvantages. That is to say, a secondary locking mechanism is needed that does not increase parts count. Also, a secondary locking mechanism that is not removable from the device is highly desirable.

SUMMARY OF THE INVENTION

One aspect of the present invention is a latching element for use in a latch system for an enclosure comprising first and second enclosure structures. The latching element comprises a holding compartment for holding a battery of predetermined size and shape, and a latch member adjacent to the holding compartment for engaging with a hook formed in the second enclosure structure to latch together the first and second enclosure structures. The latching element further comprises a flexible extender member coupled between the first enclosure structure and the latch member for extending the latch member into the second enclosure structure. The flexible extender member and the latch member are constructed such that, in the absence of a deflecting force against the latch member in a direction to deflect the latch member away from the hook, the latch member remains engaged with the hook when the battery is not in the holding compartment. Mechanical interference between the battery and the latch member further prevents the latch member from disengaging from the hook, even in the presence of a deflecting force against the latch member, when the battery is in the holding compartment.

Another aspect of the present invention is a latch system for an enclosure. The latch system comprises a first enclosure structure comprising a flexible latching element, and a second enclosure structure comprising a hook for coupling the second enclosure structure to the first enclosure structure. The latch system further comprises a holding compartment within the first and second enclosure structures and adjacent to the flexible latching element for holding a battery of predetermined size and shape. The flexible latching element comprises a latch member for engaging with the hook to latch together the first and second enclosure structures, and a flexible extender member coupled between the first enclosure structure and the latch member for extending the latch member into the second enclosure structure. The flexible extender member and the latch member are constructed such that, in the absence of a deflecting force against the latch member in a direction to deflect the latch member away from the hook, the latch member remains engaged with the hook when the battery is not in the holding compartment. Mechanical interference between the battery and the latch member further prevents the latch member from disengaging from the hook, even in the presence of a deflecting force against the latch member, when the battery is in the holding compartment.

Another aspect of the present invention is a selective call receiver including a printed circuit board comprising selective call receiver circuits for receiving selective call messages and for presenting the received selective call messages to a user. The selective call receiver further includes a housing providing a first cavity for enclosing the printed circuit board and a second cavity for enclosing a battery, and a latch system for the housing. The latch system comprises a first housing section including a flexible wall adjacent to the second cavity, the flexible wall comprising a snap latch, and a second housing section including a hook for engaging the snap latch for coupling the second housing section to the first housing section. The snap latch comprises a latch member having an aperture for engaging with the hook to latch together the first and second housing sections, and a flexible extender member coupled between the first housing section and the latch member for extending the latch member into the second housing section. The flexible extender member and the latch member are constructed such that, in the absence of a deflecting force against the latch member in a direction to deflect the latch member away from the hook, the latch member remains engaged with the hook when the battery is not in the holding compartment. Mechanical interference between the battery and the latch member further prevents the latch member from disengaging from the hook, even in the presence of a deflecting force against the latch member, when the battery is in the holding compartment.

DESCRIPTION OF THE PREFERRED EMBODIMENT

Figure 1:
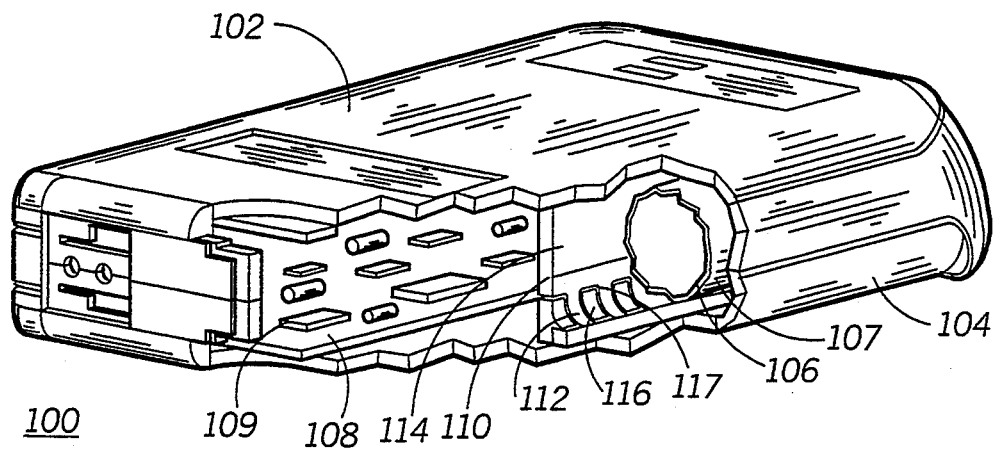
FIG. 1 is an isometric view of a selective call receiver comprising a supplementary housing locking mechanism shown in a locked position in accordance with the preferred embodiment of the present invention.
Figure 2:
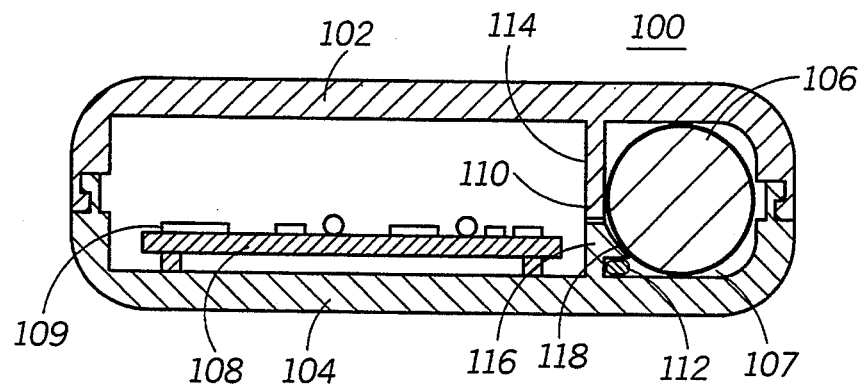
FIG. 2 is an orthographic end view of the selective call receiver comprising the supplementary housing locking mechanism shown in the locked position in accordance with the preferred embodiment of the present invention.
Figure 3:
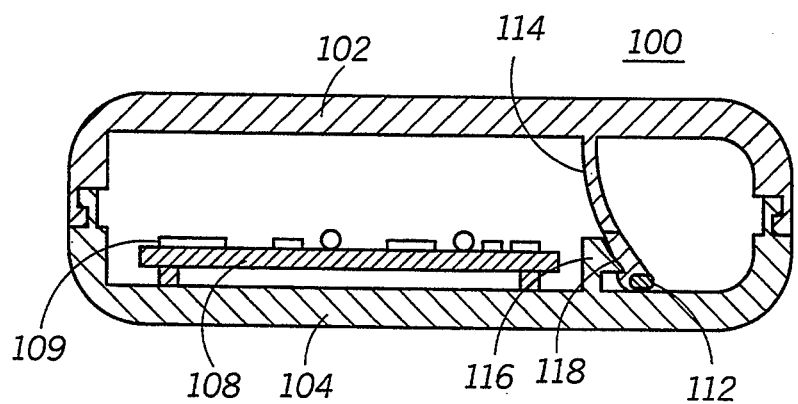
FIG. 3 is an orthographic end view of the selective call receiver comprising the supplementary housing locking mechanism shown in an unlocked position with battery removed in accordance with the preferred embodiment of the present invention.

Referring to FIGS. 1, 2, and 3, one isometric and two orthographic views, respectively, of a selective call receiver 100 comprising a supplementary housing locking mechanism in accordance with the preferred embodiment of the present invention show a first housing structure 102 and a second housing structure 104. The selective call receiver 100 further includes a battery 106 enclosed within a holding compartment 107 for holding the battery 106 in place, and a printed circuit board 108 comprising selective call receiver circuits 109 for receiving selective call messages and presenting the selective call messages to a user.

The supplementary housing locking mechanism comprises a movable snap wall 110 that comprises a movable extender member 114 cantilevered from the first housing structure 102. The movable extender member 114 is coupled to a latch member 112 for coupling to the second housing structure to latch the first and second housing structures 102, 104 when the latch member 112 is in a first position, as shown in FIGS. 1 and 2. The second housing structure 104 comprises a plurality of hooks 116 having a curved upper surface 118 as shown in FIG. 2, the plurality of hooks 116 for mating with corresponding apertures 117 shown in FIG. 1 in the latch member 112.

To assemble the first and second housing structures 102, 104 the first and second housing structures 102, 104 are aligned with one another (with the battery 106 removed) and then a moderate compression force is applied. The compression force causes the lower portion of the movable snap wall 110 to deflect to the right (in the FIG. 3 view) as the latch member 112 slides against the curved upper surface 118 of the plurality of hooks 116. When the latch member 112 has moved downward enough for the apertures 117 in the latch member 112 to admit the plurality of hooks 116, the latch member 112 snaps back to the left, thus locking the latch member 112 to the plurality of hooks 116, as shown in FIGS. 1 and 2.

FIG. 2 shows that when the battery 106 is in the holding compartment 107, the battery 106 will interfere mechanically with the latch member 112 if the latch member 112 begins to move away from the plurality of hooks 116 and towards an unlocked position. As a consequence, the supplementary housing locking mechanism is prevented from becoming unlocked as long as the battery 106 is in the holding compartment 107.

To unlock the supplementary housing locking mechanism when the battery 106 is removed from the holding compartment 107, a tool, e.g., a small screwdriver blade, is inserted against the latch member 112 to deflect the lower portion of the movable snap wall 110 to the right. When the latch member 112 is moved far enough to be clear of the plurality of hooks 116, as shown in FIG. 3, the supplementary housing locking mechanism is in the unlocked position, allowing the first and second housing structures to be separated.

Preferably, the first and second housing structures 102, 104, the movable snap wall 110, and the hooks 116 are constructed of an injection molded plastic, such as a polycarbonate plastic. By constructing these items of injection molded plastic, the first housing structure 102 and the movable snap wall 110 can be molded as a single unit, as can the second housing structure 104 and the hooks 116.

Thus, the present invention comprises a supplementary housing locking mechanism that provides all the advantages offered by conventional secondary locking mechanisms, while eliminating the disadvantages. The present invention provides a supplementary housing locking mechanism that is cost effective and does not increase parts count, because a battery compartment wall is required for battery operated devices such as a selective call receiver, with or without the supplementary housing locking mechanism. Also, the supplementary housing locking mechanism according to the present invention is not removable from the device, thus eliminating the possibility of loss of the supplementary housing locking mechanism while unlocked. So long as a battery is in the battery compartment, a user of a selective call receiver according to the present invention may rest assured that the housing structures of the selective call receiver will remain latched together to protect the circuitry enclosed therein, even under highly adverse conditions such as during an accidental drop to a hard surface.

What is claimed is:

1. A latching means for use in a latch system for an enclosure comprising first and second enclosure structures, the latching means comprising:

a holding compartment for holding a battery of predetermined size and shape;

a latch member adjacent to the holding compartment for engaging with a hook formed in the second enclosure structure to latch together the first and second enclosure structures; and a flexible extender member coupled between the first enclosure structure and the latch member for extending the latch member into the second enclosure structure, wherein the flexible extender member and the latch member are constructed such that, in the absence of a deflecting force against the latch member in a direction to deflect the latch member away from the hook, the latch member remains engaged with the hook when the battery is not in the holding compartment, and wherein mechanical interference between the battery and the latch member further prevents the latch member from disengaging from the hook, even in the presence of a deflecting force against the latch member, when the battery is in the holding compartment.

2. The latching means according to claim 1, wherein the latching means is constructed of an injection molded plastic.

3. The latching means according to claim 1, wherein the flexible extender member is formed such that the flexible extender member comprises a cantilever extending towards the second enclosure structure for a distance that is substantially greater than the cross-section thickness of the flexible extender member.

4. A latch system for an enclosure, the latch system comprising:

a first enclosure structure comprising a flexible latching means;

a second enclosure structure comprising a hook for coupling the second enclosure structure to the first enclosure structure; and a holding compartment within the first and second enclosure structures and adjacent to the flexible latching means for holding a battery of predetermined size and shape, wherein the flexible latching means comprises:

a latch member for engaging with the hook to latch together the first and second enclosure structures; and a flexible extender member coupled between the first enclosure structure and the latch member for extending the latch member into the second enclosure structure, and wherein the flexible extender member and the latch member are constructed such that, in the absence of a deflecting force against the latch member in a direction to deflect the latch member away from the hook, the latch member remains engaged with the hook when the battery is not in the holding compartment, and wherein mechanical interference between the battery and the latch member further prevents the latch member from disengaging from the hook, even in the presence of a deflecting force against the latch member, when the battery is in the holding compartment.

5. The latch system according to claim 4, wherein the flexible extender member is formed such that the flexible extender member comprises a cantilever extending towards the second enclosure structure for a distance that is substantially greater than the cross-section thickness of the flexible extender member.

6. The latch system according to claim 4, wherein the latch member is formed such that there is an aperture corresponding to the hook for coupling with the hook to latch the first and second enclosure structures when the latch member is engaged with the hook.

7. The latch system according to claim 4, wherein the first enclosure structure is constructed of an injection molded plastic, and wherein the latching means is a contiguous portion of the first enclosure structure.

8. A selective call receiver comprising:

a printed circuit board comprising selective call receiver circuits for receiving selective call messages and for presenting the received selective call messages to a user;

a housing providing a first cavity for enclosing the printed circuit board and a second cavity for enclosing a battery; and a latch system for the housing, the latch system comprising:

a first housing section comprising a flexible wall adjacent to the second cavity, the flexible wall comprising a snap latch; and a second housing section comprising a hook for engaging the snap latch for coupling the second housing section to the first housing section;

wherein the snap latch comprises:

a latch member having an aperture for engaging with the hook to latch together the first and second housing sections; and a flexible extender member coupled between the first housing section and the latch member for extending the latch member into the second housing section, and wherein the flexible extender member and the latch member are constructed such that, in the absence of a deflecting force against the latch member in a direction to deflect the latch member away from the hook, the latch member remains engaged with the hook when the battery is not in the holding compartment, and wherein mechanical interference between the battery and the latch member further prevents the latch member from disengaging from the hook, even in the presence of a deflecting force against the latch member, when the battery is in the holding compartment.

9. The selective call receiver according to claim 8, wherein the flexible extender member is formed such that the flexible extender member comprises a cantilever extending towards the second housing section for a distance that is substantially greater than the cross-section thickness of the flexible extender member.

10. The selective call receiver according to claim 8, wherein the housing and the latch system are constructed of an injection molded plastic.

11. The selective call receiver according to claim 8, wherein the flexible wall is a contiguous portion of the first housing section.

* * * * *